United States Patent [19]

Waters

[11] Patent Number: 4,864,290

[45] Date of Patent: Sep. 5, 1989

[54] DISPLAY DEVICE

[75] Inventor: Colin M. Waters, Frodsham, England

[73] Assignee: Thorn EMI plc, London, England

[21] Appl. No.: 98,207

[22] Filed: Sep. 18, 1987

[30] Foreign Application Priority Data

Sep. 26, 1986 [GB] United Kingdom ............... 8623240

[51] Int. Cl.$^4$ ............................................. G09G 3/20
[52] U.S. Cl. .................................. 340/793; 340/784; 340/805
[58] Field of Search ............... 340/793, 765, 784, 805; 350/350 S, 331 R, 332, 333

[56] References Cited

U.S. PATENT DOCUMENTS

| | | | |
|---|---|---|---|
| 4,508,429 | 4/1985 | Nagae et al. | 340/805 |
| 4,525,710 | 6/1985 | Hoshi et al. | 340/784 |
| 4,705,345 | 11/1987 | Ayliffe et al. | 340/784 |
| 4,709,995 | 12/1987 | Kuribayashi et al. | 350/350 S |
| 4,712,877 | 12/1987 | Okada et al. | 350/350 S |
| 4,728,947 | 3/1988 | Ayliffe et al. | 340/784 |

FOREIGN PATENT DOCUMENTS

| | | |
|---|---|---|
| 0151508 | 8/1985 | European Pat. Off. |
| 1594151 | 7/1981 | United Kingdom |
| 2079509 | 1/1982 | United Kingdom |

*Primary Examiner*—Leo H. Boudreau
*Assistant Examiner*—Jeffery A. Brier
*Attorney, Agent, or Firm*—Fleit, Jacobson, Cohn, Price, Holman & Stern

[57] ABSTRACT

The liquid crystal display unit 1, has a video signal receiver 2 and a store 3. Time-modulation grey-scale addressing of the ferroelectric liquid crystal pixels in a display panel 4 is provided to a store 10 which records the number of changes of state for each pixel during one picture-signal. Once the most-significant bit has been processed and is being displayed on the panel 4, the change-of-state store 10 has the net number of changes which the pixel has undergone in that picture. Controller 11 causes store 10 to output the value appropriate to that pixel and pass it to driver unit 9 to produce a compensating pulse (whether positive, negative or zero) necessary to ensure that there is no net electrical potential over the entire picture interval. The display produced by the compensating pulse is cleared immediately the first data of the next picture is input to the pixel. Assuming that the LSB of the data for a pixel already on display in panel 4, then in the next scan extractor 6 passes the next LSB to comparator 7 whose other input is connected to a pixel-state store 8. Accordingly, the new bit-value is compared with the existing state of the pixel, and comparator 7 passes on an instructing signal to pixel driver unit 9 only if the state of the pixel requires changing; in such an eventuality, the driver unit 9 issues an appropriate monopulse select voltage. Comparator 7 also passes such an instructing signal.

10 Claims, 2 Drawing Sheets

DISPLAY DEVICE

The prsent invention relates to a display device, and particularly but not solely to a liquid crystal display.

It is generally known that the subjection of ferro-electric liquid crystal displays to long-term electrical potential can cause degradation of the liquid crystal material (e.g. by ion migration from the glass substrate) and hence result in significant deterioration of operation of the display and reduction in lifetime. Thus, conventionally the data drive is a bi-polar pulse in phase or in anti-phase with the bi-polar row select drive. The leading pulse of a bi-polar signal serves as an electric potential compensator while the succeeding pulse switches the pixel to the desired state.

G.B. Patent Specification Publication No. 2079509 describes an arrangement which attempts to cancel the electrical potential by inverting both the drive voltage and the common electrode voltage in alternate frames. However complete cancellation throughout the display would occur only if the two frames were identical, and therefore there can be haphazard patterns of potential in existence for indeterminate time lengths, causing random deterioration of the liquid crystal material.

The present invention provides a display device comprising:
means to receive signals representing a plurality of pictures for display;
a lattice of pixels;
means to address each pixel a number of times for each picture-signal, the addressing means including means to apply an uni-polar signal to the pixel in accordance with a portion of a picture-signal appropriate to that pixel;
means to determine any net electrical potential value resultant from the addressing of a pixel for one picture;
means to apply a correction signal to a pixel in accordance with the output from the determining means.

In this way, the device can operate with a uni-polar pulse which reduces the time for addressing by one half as compared to that with a bi-polar pulse, while ensuring that there is no detrimental effect due to electrical potential. This can be achieved by ensuring that any potential caused by the uni-polar pulses are cancelled at the end of each set of addresses corresponding to a picture-signal for one pixel.

Preferably, the addressing means comprises means to apply an uni-polar signal to a pixel only when there is a change in the state of the pixel, and the determining means comprises means to count the number of changes in state for a pixel during its addressing for one picture-signal. As an electrical potential is only produced when a change in state of the pixel occurs, monitoring of the number of changes of state gives an indication of the net potential existing.

Furthermore, if a pixel is addressed N times during a picture-signal, where N is the number of bits in each grey level byte, the difference between the number of 1-to-0 changes and the number of 0-to-1 changes can only be 1 or 0, and the net electrical potential only +1, −1 or 0 units.

Preferably, the correction means applies, in use, a correction signal in respect of one address prior to the initiation of the subsequent address for the next picture.

Preferably, the display device comprises means to store the output of the determining means appropriate to each of a number of pixels, and means to pass the stored information to the correction means to apply a correction signal, advantageously intermediate that address and the subsequent address.

The present invention also provides a method of operating a display device having a lattice of pixels the method comprising:
addressing each pixel a number of times for each picture-signal, including applying uni-polar signal to the pixel in accordance with a portion of a picture-signal appropriate to that pixel;
determining any net electrical potential value resultant from the addressing of a pixel for one picture;
to applying a correction signal to a pixel in accordance with the output from the determining stage.

Preferably, the method comprises applying an unipolar signal to a pixel only when there is a change in the state of the pixel, and counting the number of changes in state for a pixel during its addressing for one picture-signal.

Preferably, the method comprises applying a correction signal in respect of one address prior to the initiation of the subsequent address for the next picture.

Preferably, the method comprises storing the output of the determining stage appropriate to each of a number of pixels, and passing the stored information to the correction stage to apply a correction signal, advantageously intermediate that address and the subsequent address.

Preferably, a pixel comprises one or more liquid crystal cells.

The present invention is applicable to colour displays and to monochrome displays.

The present invention also embodies equipment for the generation, and/or transmission, and/or reception, and/or processing, of signals suited and/or designed for a display device as herein defined.

In order that the invention may more readily be understood, a description is now given, by way of example only, reference being made to the accompanying drawings, in which.

Figure 1:
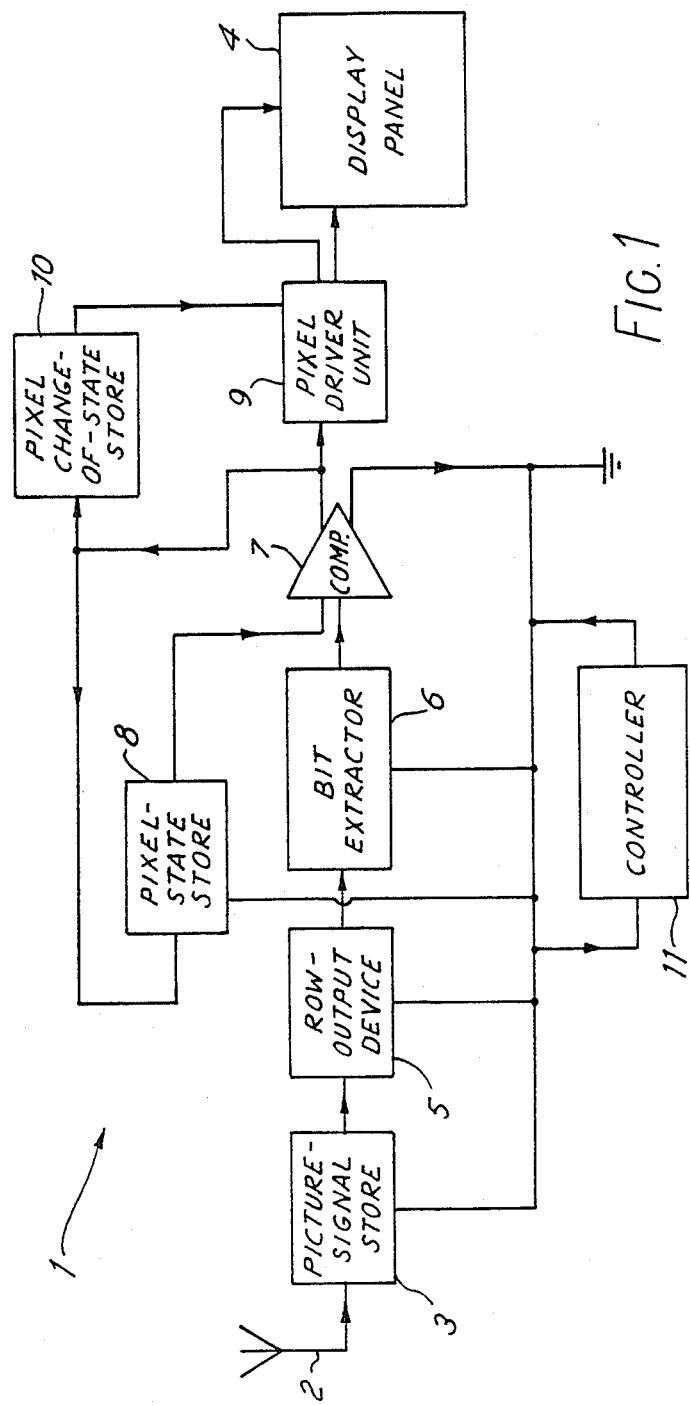
FIG. 1 is a block circuit diagram of a liquid crystal display embodying the present invention.

In FIG. 1, the liquid crystal display unit, generally designated as 1, has a video signal receiver 2 and a store 3 with a capacity to hold an adequate amount of the video signals to enable the display of a complete image, i.e. one picture of the video signal. The format of the video signal is such as to provide time-modulation grey-scale addressing of the pixels in a display panel 4 consisting of a lattice of 600 rows each of 50 bi-stable surface-stabilised ferroelectric liquid crystal pixel-elements; for one picture, the video signal has four data bits for each pixel. In this addressing scheme, the lattice is scanned four times each picture, the setting for each pixel being in accordance with the appropriate bit, and the time duration of the pixel in that setting being dependent on the significance of that bit.

There are four row-output devices (only one, 5, being shown), each of which enables the video information for a row of pixels to be taken out of picture store 3; each row-output device 5 has a bit extractor 6 to separate out one bit of the information for each pixel of the respective row. The extractors of the different row-output devices are arranged to operate on bits of differing significence.

Figure 2:
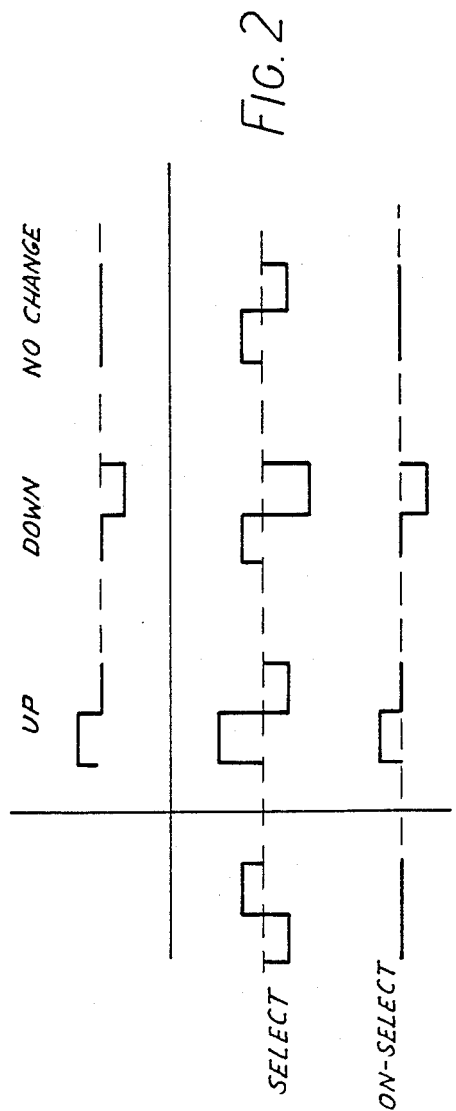
FIG. 2 is a representation of the addressing waveforms for use in the display of FIG. 1.

Consider now how the display device 1 operates in relation to the data bits in one picture signal for a single pixel of panel 4. Assuming that the least-significant data bit is already on display at the relevant pixel in panel 4, then in the next scan extractor 6 passes the next least significant bit to a comparator 7 whose other input is connected to a pixel-state store 8. Accordingly, the new bit-value is compared with the existing state of the pixel, and comparator 7 passes on an instructing signal to pixel driver unit 9 only if the state of the pixel requires changing; in such an eventuality, the driver unit 9 issues an appropriate monopulse select voltage of the format shown in FIG. 2. Comparator 7 also passes such an instructing signal not only to pixel-state store 8 in order to updata its record of the display state of the respective pixel, but also to a store 10 which records the number of changes of state for each pixel during one picture-signal.

If comparator 7 determines that this next bit corresponds to the present state of the pixel, the comparator 7 does not output an instructing signal to driver unit 9, but only sends a signal to controller 11 to indicate the equivalence result of the comparison test.

Figure 3:
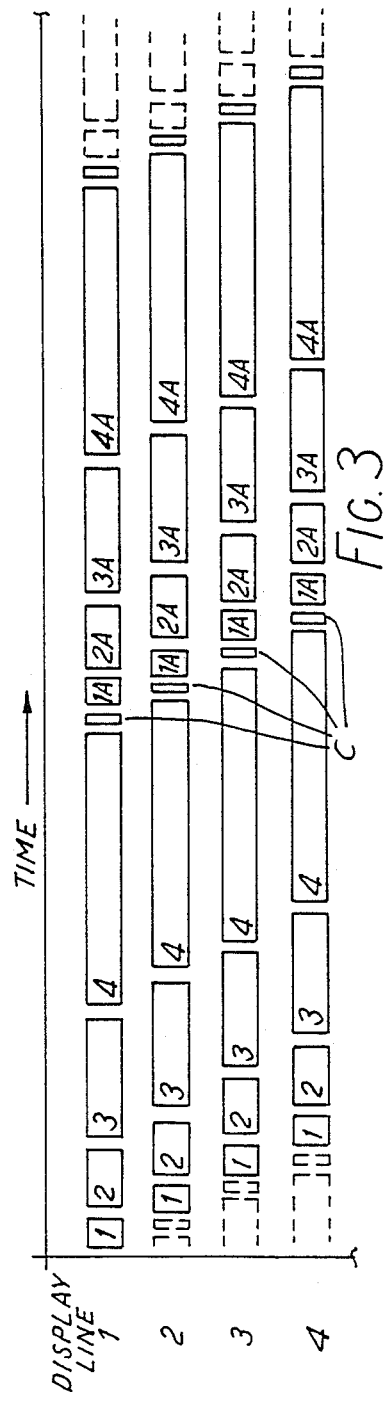
FIG. 3 is a representation of the signal input to the display of FIG. 1.

This sequence of events is repeated for each of the remaining bits corresponding to that pixel in the same picture-signal; thus, once the most-significant bit has been processed and is being displayed on the panel 4, the change-of-state store 10 has the net number of changes which the pixel has undergone in that picture. As the difference between the number of 1-to-0 changes and the number of 0-to-1 changes can only be 1 or 0 and the net electrical potential on that pixel only $+1$, $-1$ or 0 units, then the value held in store 10 for that pixel corresponds to the net electrical potential. Accordingly, controller 11 causes store 10 to output the value appropriate to that pixel and pass it to driver unit 9 to produce a compensating pulse (whether positive, negative or zero) necessary to ensure that there is no net electrical potential over the entire picture interval. The display produced by the compensating pulse is cleared immediately the first data of the next picture is input to the pixel (see Figure 3), and therefore it remains for a period of time which has an insignifant detrimental effect on the image. FIG. 3 illustrates the position of the compensating pulse C in relation to adjacent picture-signals wherein, for each display line, blocks 1, 2, 3, 4 relate to addressing for the least-significant bit upwards in relation to the first picture-signal, and blocks 1A, 2A, 3A, 4A relate to addressing for the least-significant bit upwards in relation to the next picture-signal.

In display unit 1, the available switching pulse time is increased by a factor of 1.6 over conventional arrangements. In addition, since the capacitance of non-selected lines is not charged when the data on selected rows remains unchanged (this being approximately 50% of the time) and the frequency of the charging a.c. is almost halved, the total power requirement will be reduced by about a factor of 4.

While the invention has been specifically described in relation to liquid crystal displays, it is applicable to any form of display in which it is desired to avoid the long-term build-up of electrical potential.

I claim:

1. A display device comprising:
   a lattice of pixels; means to receive a signal representing a picture for display, the signal comprising one or more portions for each pixel;
   means to address each pixel a number of times for each picture-signal, the addressing means including means to apply a uni-polar signal to the pixel in accordance with a respective said one or more portion;
   means to address each pixel a number of times for each picture-signal, the addressing means including means to apply a uni-polar signal to the pixel in accordance with a respective said one or more portion;
   means to determine any net electrical potential value resultant from the addressing of a pixel for one picture;
   and means to apply a correction signal to a pixel in accordance with the output from the determining means.

2. A display device according to claim 1, wherein the addressing means comprises means to apply a uni-polar signal to a pixel only when there is a change in the state of the pixel, and the determining means comprises means to count the number of changes in state for a pixel during its addressing for one picture-signal.

3. A display device according to claim 1, wherein the correction means applied a correction signal to a pixel in respect of its addressing for one picture-signal prior to the initiation of the subsequent address for the next picture.

4. A display device according to claim 1, wherein the display device comprises means to store the output of the determining means as stored information for each of a number of pixels, and means to pass the stored information to the correction means to apply a correction signal.

5. A display device according to claim 1, wherein liquid crystal cells form the lattice of pixels.

6. A method of operating a display device having a lattice of pixels, the method comprising the steps of:
   receiving a signal representing a picture for display, the signal comprising one or more portions for each signal;
   addressing each pixel a number of times for each picture-signal, including applying a uni-polar signal to the pixel in accordance with a respective said one or more portions;
   determining any net electrical potential value resultant from the addressing of a pixel for one picture;
   and applying a correction signal to a pixel in accordance with the result of the determining step.

7. A method according to claim 6, comprising applying a uni-polar signal to a pixel only when there is a change in the state of the pixel, and counting the number of changes in state for a pixel during its addressing for one picture-signal.

8. A method according to claim 6, comprising applying a correction signal to a pixel in respect of its addressing for one picture-signal prior to the initiation of the subsequent address for the next picture.

9. A method according to claim 6, comprising storing the result of the determining step as stored information for each of a number of pixels, and applying a correction signal, in response to the stored information.

10. A method according to claim 6 wherein liquid crystal cells form the lattice of pixels.

* * * * *